Patented Oct. 9, 1923.

1,469,839

UNITED STATES PATENT OFFICE.

KIYOSHI KAWASHIMA, OF MITSUGI-GUN, JAPAN.

THE MANUFACTURE OF A COATING FOR CLOTHS FOR AEROPLANE WINGS OR PLANES AND THE LIKE.

No Drawing.   Application filed December 11, 1922.   Serial No. 606,258.

*To all whom it may concern:*

Be it known that I, KIYOSHI KAWASHIMA, a subject of the Emperor of Japan, residing at No. 364 Mihara-machi, Mitsugi-gun, Hiroshima-ken, in the Empire of Japan, have invented certain new and useful Improvements in the Manufacture of a Coating for Cloths for Aeroplane Wings or Planes and the like, of which the following is a specification.

This invention relates to a method of producing a weather-proofing material to be applied to cloths for the wings or planes of aeroplanes and the like.

The object of the invention is to produce such a weather-proofing material which is of the best quality and capable of withstanding high temperatures, with the advantage that the coating being capable of firmly sticking to the wing-cloths is not liable to exfoliate by shocks or vibrations of the wings or planes of aeroplanes.

Another object of the invention is to increase the weather-proof quality of the wing-cloths, and to maintain the desired durability, extensibility and resiliency of the wing-covering enabling it to maintain the same always in their stretched condition regardless of changes of temperatures and moistures.

According to this invention, the above-mentioned objects in view, suitable quantity of nitrocellulose is first treated with an aqueous solution of boric acid or with an aqueous solution of boric acid and hydrogen peroxide, and then it is dissolved in acetone, and then boric acid and magnesium chloride are dissolved in the same, and the resulting solution may be used as a weather-proofing coating.

In carrying out the invention into practice, the process is divided into two stages. In the first stage, nitrocellulose is denitrated to a suitable extent by treating it with an aqueous solution of boric acid. The solution may be prepared in the following proportion:—

Water _____ 100
Boric acid _____ 10–15

In another case, nitrocellulose may be treated with an aqueous solution of boric acid and hydrogen peroxide, its proportion being as follows:—

Water _____ 100
Boric acid _____ 5–10
Hydrogen peroxide _____ 5–10

The nitrocellulose is treated with said solution for, for example, three hours, and then it is washed with clean water and dried.

In the second stage, the nitrocellulose thus treated is dissolved in acetone in the usual manner, and then boric acid and magnesium chloride are dissolved in the same in the following proportion:—

Nitrocellulose solution _____ 100
Boric acid _____ 10–15
Magnesium chloride _____ 10–15

The solution produced by the foregoing process may be used as a weather-proofing material and may be applied to cloths for the wings or planes of aeroplanes and the like, and the coating sticks firmly to cloths and is not liable to exfoliate by the vibration of the wings or planes of aeroplanes, and yet the desired extensibility and resiliency of the cloths may be maintained. The wing-cloths may be maintained always in their stretched condition. By experiments, it has been found that the coated surfaces of aeroplane wings or planes are not damaged at any temperature of less than 200° C.

What I claim is:—

1. A method of producing a coating material for cloths for aeroplane wings or planes and the like, which consists in treating nitrocellulose with an aqueous solution of boric acid, and then dissolving said treated nitrocellulose in acetone, and then dissolving boric acid and magnesium chloride in the same.

2. A method of producing a coating material for cloths for aeroplane wings or planes and the like, which consists in treating nitrocellulose with an aqueous solution of boric acid and hydrogen peroxide, and then dissolving said treated nitrocellulose in acetone, and then dissolving boric acid and magnesium chloride in the same.

3. A coating for cloths for aeroplane wings or planes and the like, which is made from denitrated nitrocellulose, acetone, boric acid and magnesium chloride.

In testimony whereof I affix my signature.

KIYOSHI KAWASHIMA.